United States Patent [19]
Lee et al.

[11] Patent Number: 5,757,964
[45] Date of Patent: May 26, 1998

[54] SYSTEM AND METHOD FOR AUTOMATIC SUBCHARACTER UNIT AND LEXICON GENERATION FOR HANDWRITING RECOGNITION

[75] Inventors: Kai-Fu Lee; Yen-Lu Chow, both of Saratoga; Kamil Grajski, San Jose, all of Calif.

[73] Assignee: Apple Computer, Inc., Cupertino, Calif.

[21] Appl. No.: 901,989

[22] Filed: Jul. 29, 1997

Related U.S. Application Data

[63] Continuation of Ser. No. 306,016, Sep. 14, 1994, abandoned.

[51] Int. Cl.$^6$ ............................................. G06K 9/72
[52] U.S. Cl. ................................... 382/229; 382/198
[58] Field of Search ............................. 382/198, 224, 382/225, 226, 229, 177, 209; 704/251, 254, 256

[56] References Cited

U.S. PATENT DOCUMENTS

| 4,979,227 | 12/1990 | Mittelbach et al. | 382/231 |
| 5,392,363 | 2/1995 | Fujisaki et al. | 382/229 |

FOREIGN PATENT DOCUMENTS

| 0539749 | 5/1993 | European Pat. Off. | G06K 9/62 |

OTHER PUBLICATIONS

Breiman et al "Classification and Regression Tree" (1984), pp. 18–27, 59–66, Wadsworth & Brooks/Cole Advanced Book & Software.

"Discrete Parameter System for Automatic Handwriting Recognition," IBM Technical Bulletin, vol. 37, No. 02A, Feb. 1994, pp. 531–532.

Lee et al, A Segment Model Based Approach To Speech Recognition, 1988, 501–04.

Kundu & Bahl, Recognition of Handwritten Script: A Hidden Markov Model Based Approach, 1988, 928–31.

*Primary Examiner*—Yon J. Couso
*Attorney, Agent, or Firm*—Carr & Ferrell, LLP

[57] ABSTRACT

A system for automatic subcharacter unit and lexicon generation for handwriting recognition comprises a processing unit, a handwriting input device, and a memory wherein a segmentation unit, a subcharacter generation unit, a lexicon unit, and a modeling unit reside. The segmentation unit generates feature vectors corresponding to sample characters. The subcharacter generation unit clusters feature vectors and assigns each feature vector associated with a given cluster an identical label. The lexicon unit constructs a lexical graph for each character in a character set. The modeling unit generates a Hidden Markov Model for each set of identically-labeled feature vectors. After a first set of lexical graphs and Hidden Markov Models have been created, the subcharacter generation unit determines for each feature vector which Hidden Markov Model produces a highest likelihood value. The subcharacter generation unit relabels each feature vector according to the highest likelihood value, after which the lexicon unit and the modeling unit generate a new set of lexical graphs and a new set of Hidden Markov models, respectively. The feature vector relabeling, lexicon generation, and Hidden Markov Model generation are performed iteratively until a convergence criterion is met. The final set of Hidden Markov Model model parameters provide a set of subcharacter units for handwriting recognition, where the subcharacter units are derived from information inherent in the sample characters themselves.

17 Claims, 7 Drawing Sheets

SYSTEM AND METHOD FOR AUTOMATIC SUBCHARACTER UNIT AND LEXICON GENERATION FOR HANDWRITING RECOGNITION

RELATED APPLICATIONS

This is a continuation of application Ser. No. 08/306,016 filed on Sep. 14, 1994, now abandoned.

CROSS-REFERENCE TO RELATED APPLICATIONS

The present invention is related to and incorporates by reference U.S. patent application Ser. No. 08/204,031, entitled "A Handwriting Signal Processing Front-End for Handwriting Recognizers," filed on Mar. 1, 1994 now U.S. Pat. No. 5577135; and U.S. patent application Ser. No. 08/300,426, entitled "Automatic Method for Scoring and Clustering Prototypes of Handwritten Stroke-Based Data", filed on Sep. 2, 1994 now pending.

BACKGROUND OF THE INVENTION

1. Field of the Invention

The present invention relates generally to systems and methods for handwriting recognition, and more particularly to systems and methods for handwriting recognition based upon subcharacter units. Still more particularly, the present invention is a system and method for automatic subcharacter unit and lexicon generation for handwriting recognition.

2. Description of the Background Art

Systems and methods for handwriting recognition are commonly based upon pattern recognition techniques such as neural networks, hidden Markov models, or template matching. Pattern recognition techniques rely upon the definition of a set of fundamental handwriting units, such that any observed handwriting sequence can be decomposed into a sequence of these fundamental handwriting units and interpreted according to a lexicon.

In the prior art, two approaches have been used to define the set of fundamental handwriting units. A first prior art approach defines the set of fundamental handwriting units as the set of entries in the lexicon itself. For example, when dealing with ideographic languages, such as Asian languages, the first prior art approach defines the set of fundamental handwriting units as a subset of the characters in a particular language. Analogously, when dealing with the English language, the first prior art approach defines the set of fundamental handwriting units as a subset of the words in the English language.

Handwriting style can vary greatly from one person to another. Thus, in the first prior art approach, the pattern recognizer must be able to determine when handwriting data exhibiting great variance corresponds to the same fundamental handwriting unit. This in turn requires that the pattern recognizer be trained using fundamental handwriting units having great variance, which results in lower pattern recognition performance.

Asian languages typically have thousands of individual characters. Similarly, thousands of words exist in the English language. The first prior art approach therefore would require multiple samples of each of the thousands of fundamental handwriting units to successfully perform general-purpose handwriting recognition. It is unlikely that a such a large data set could be successfully collected and processed. Additionally, pattern recognition techniques do not scale well as the amount of training data increases. Thus, for general-purpose handwriting recognition applications, the first prior art approach is unacceptably inefficient.

A second prior art approach defines the set of fundamental handwriting units as a set of subcharacter units, where each subcharacter unit corresponds to a handwriting feature that is common to multiple entries in the lexicon. In the English language, the set of subcharacter units is typically taken to be the letters of the English alphabet, because any English word can be decomposed into a unique sequence of letters.

For ideographic languages, subcharacter units known as radicals have been proposed. Each radical is a type of stroke or stroke sequence commonly observed within multiple ideographic characters. Many well-formed, or "printed," ideographic characters, such as Asian characters, have been successfully decomposed into a set of constituent radicals. However, certain combinations of radicals may themselves be radicals, and therefore some ideographic characters cannot be decomposed into a unique set of radicals. Unless a character can be decomposed into a unique set of radicals (or other subcharacter units), that character cannot be successfully identified in a handwriting recognition environment. Therefore, prior art systems and methods for handwriting recognition that rely upon radical identification are unable to uniquely identify many ideographic characters, and are therefore unsuitable for general use.

An additional problem arises because ideographic handwriting tends to be highly individualized and in general is not well-formed. Thus, any given radical may be written with connected strokes, and radicals themselves may be connected to each other, in a manner analogous to cursive and mixed printed-and-cursive writing in Western languages. The individualized nature of handwriting therefore makes identification of individual radicals very difficult, and often prevents the successful decomposition of a given ideographic character into a unique set of radicals.

What is needed is a means for generating a set of subcharacter units for cursive-style ideographic characters that can be readily identified within a sample character by a handwriting recognition system, and that can uniquely represent each ideographic character in a character set.

SUMMARY OF THE INVENTION

The present invention is a system and method for automatic subcharacter unit and lexicon generation for handwriting recognition. The system of the present invention comprises a processing unit, a handwriting input device, and a memory wherein a segmentation unit, a subcharacter generation unit, a lexicon unit, and a modeling unit reside. The segmentation unit prompts the handwriting input device to receive sample characters as input, each of which is a handwritten version of a particular reference character within a known character set. The segmentation unit partitions each sample character into one or more segments, and then performs feature extraction operations on each segment to create a feature vector. Each feature vector is a numerical representation of a particular segment.

The subcharacter generation unit organizes similar feature vectors into clusters, and assigns each feature vector associated with a given cluster an identical label. The lexicon unit constructs a lexical graph for each character in the character set, where the lexical graph comprises a label list for each sample character associated with the character. Each label in a particular sample character's label list is the label of a feature vector generated from one of the sample character's segments. The lexicon unit additionally simplifies the lexical graph. For each set of identically-labeled feature vectors, the modeling unit generates a Hidden Markov Model by determining the appropriate model parameters. The model parameters for a given Hidden Markov Model represent a subcharacter unit.

The subcharacter generation unit relabels, or regroups, each feature vector according to the label associated with the Hidden Markov Model that produces a highest likelihood value. After the relabeling, the subcharacter generation unit determines whether a convergence criterion has been satisfied. If not, the subcharacter generation unit prompts the lexicon unit to generate a new lexical graph for each character. The subcharacter generation unit also prompts the modeling unit to determine a new set of model parameters for each Hidden Markov Model, and again performs feature vector relabeling operations and tests whether the convergence criterion has been satisfied. In this manner, the subcharacter generation unit iteratively refines the set of lexical graphs and the set of subcharacter units. Once the convergence criterion has been satisfied, the set of lexical graphs and the set of subcharacter units can be used for recognizing handwritten characters corresponding to reference characters within the character set.

DETAILED DESCRIPTION OF THE PREFERRED EMBODIMENTS

Figure 1:
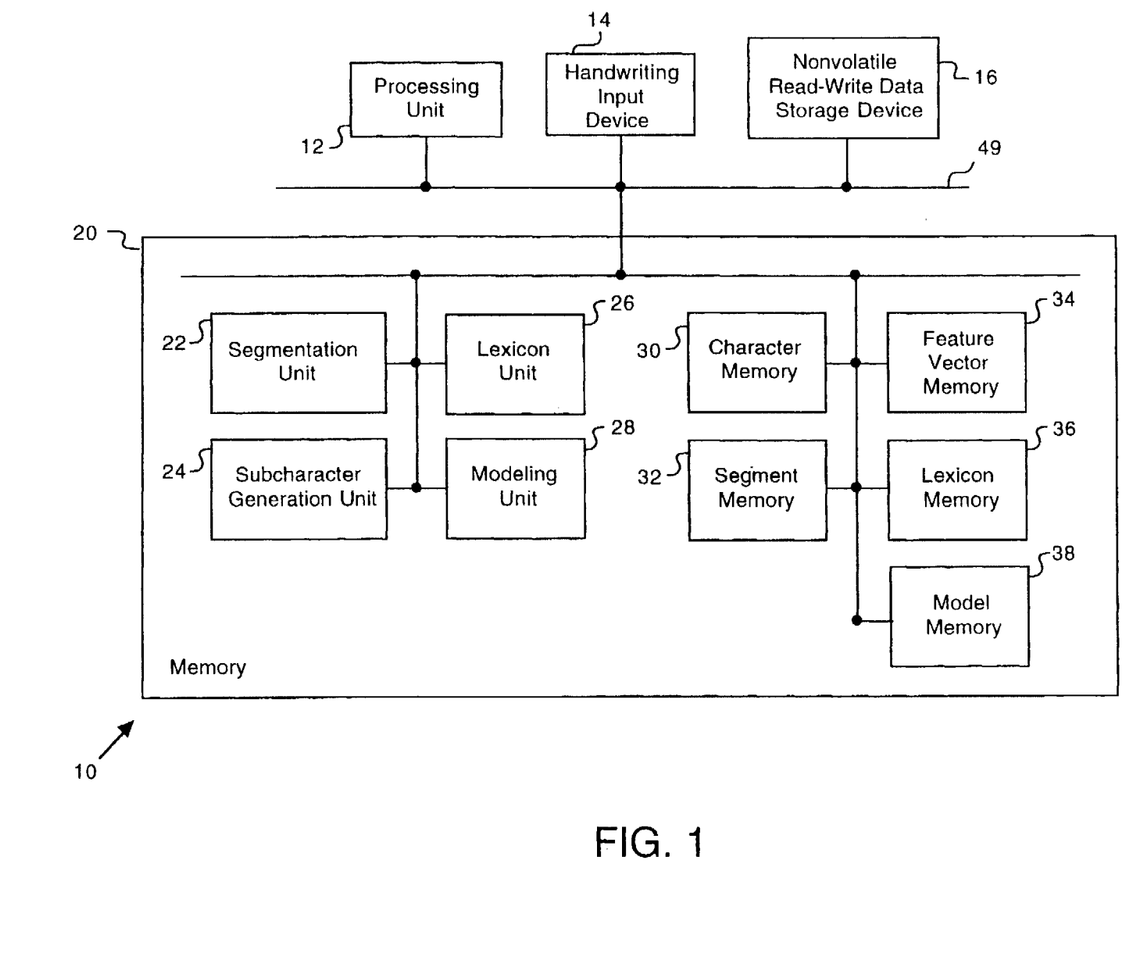
FIG. 1 is a block diagram of a preferred embodiment of a system for automatic subcharacter unit and lexicon generation for handwriting recognition constructed in accordance with the present invention.

Referring now to FIG. 1, a block diagram of a preferred embodiment of a system 10 for automatic subcharacter unit and lexicon generation for handwriting recognition constructed in accordance with the present invention is shown. The system 10 comprises a processing unit 12, a handwriting input device 14, a nonvolatile read-write data storage device 16, and a memory 20 wherein a segmentation unit 22, a subcharacter generation unit 24, a lexicon unit 26, a modeling unit 28, a character memory 30, a segment memory 32, a feature vector memory 34, a lexicon memory 36, and a model memory 38 reside. Each element of the present invention has an input and an output coupled to a common system bus 49.

In an exemplary embodiment, the system 10 of the present invention comprises an Apple Newton Personal Digital Assistant (PDA) having an ARM 610 microprocessor and 4 Megabytes of Random Access Memory (RAM) wherein the segmentation unit 22, the subcharacter generation unit 24, the lexicon unit 26, the modeling unit 28, the character memory 30, the segment memory 32, the feature vector memory 34, the lexicon memory 36, and the model memory 38 reside.

Figure 2:
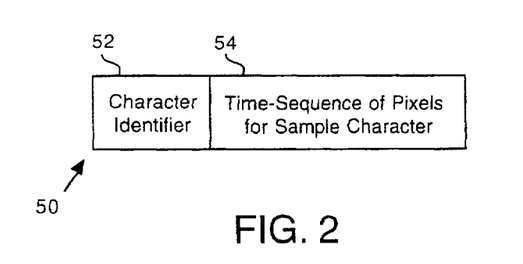
FIG. 2 is a block diagram of a preferred embodiment of a sample character structure of the present invention.
Figure 3:
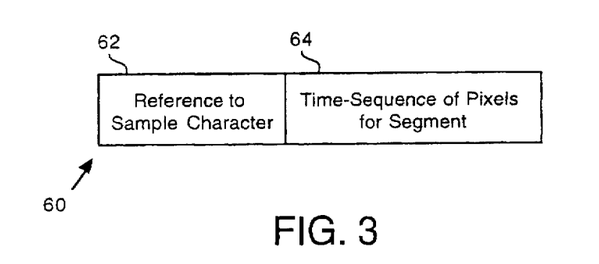
FIG. 3 is a block diagram of a preferred embodiment of a segment structure of the present invention.

As described in detail below, the present invention takes one or more versions of a character set or alphabet as input, and automatically creates a set of subcharacter-units and a corresponding character set lexicon based upon information obtained from the input itself. Once the set of subcharacter-units and the lexicon have been created, user-independent handwriting recognition operations can be performed as described below. In the preferred embodiment of the present invention, the segmentation unit 22, the subcharacter generation unit 24, the lexicon unit 26, and the modeling unit 28 each comprise a sequence of computer program steps stored in the memory 20 and executable by the processing unit 12. Those skilled in the art will recognize that one or more of the aforementioned elements could be implemented with dedicated hardware in an alternate embodiment. The handwriting input device 14 is preferably a conventional pen-and-tablet device that translates pen motions generated by a user into a sequence of output signals. Each output signal corresponds to a picture element (pixel) that has been activated in response to a pen motion. In the preferred embodiment, each output signal specifies a pixel coordinate and a time value. Preferably, the time value denotes when the pixel was activated relative to each previously-activated pixel. Those skilled in the art will recognize that in an alternate embodiment, the handwriting input device 14 could also output a pen-pressure signal for each activated pixel. The segmentation unit 22 prompts the handwriting input device 14 to receive character data from one or more users, and creates a set of feature vectors 70 from the character data as will be described below. Preferably, each user's character data consists of one or more sample characters for each reference character within a known character set. In the preferred embodiment, each sample character is a sequence of output signals generated by the handwriting input device 14, corresponding to those pixels on the handwriting input device 14 that had been activated during sample character input. Herein, a sequence of such output signals is referred to as a time-sequence of pixels. Those skilled in the art will recognize that the representation of each sample character as a time- sequence of pixels corresponds to a stroke-based character representation format. The segmentation unit 22 preferably stores each sample character in a sample character structure 50, either within the character memory 30 or upon the nonvolatile read-write data storage device 16. Referring now to FIG. 2, a block diagram of a preferred embodiment of the sample character structure 50 is shown. The sample character structure 50 is a data structure having a first data field 52 for storing a character identifier that uniquely specifies a reference character within the known character set to which the sample character corresponds, and a second data field 54 for storing the sample character itself. After the character data has been stored, the segmentation unit 22 partitions each sample character into one or more segments according to a segmentation method. Because each sample character is a time-based pixel sequence, each segment is a pixel sequence representing a portion of the sample character from which it is derived, over a particular time interval. Thus, when arranged in time-interval order, the set of segments associated with a given sample character completely reconstruct the time-sequence of pen motions that generated the sample character. The detailed operations preferably performed by the segmentation unit 22 during sample character segmentation are described in detail in U.S. patent application Ser. No. 08/204,031, filed on Mar. 1, 1994 now U.S. Pat. No. 5577135, which is incorporated by reference. The segmentation unit 22 stores each segment within a segment structure 60 in the segment memory 32, preferably in sequential order according to the time interval associated with each segment. Referring now to FIG. 3, a block diagram of a preferred embodiment of a segment structure 60 is shown. Each segment structure 60 is a data structure that includes a first data field 62 for storing a reference to the particular sample character from which the segment is derived, plus a second data field 64 for storing the segment itself. Those skilled in the art will recognize that in an alternate embodiment, the segmentation unit 22 could create each segment according to any segmentation method in general.

For each segment, the segmentation unit 22 performs feature extraction operations, in which a predetermined number of features are calculated to numerically characterize the segment. In the preferred embodiment, the calculated features include static features that provide segment curvature information such as concavity and inflection; dynamic features that provide information on geometric time-rates of change exhibited within the segment; and categorical features that classify the segment according to a relative position within the associated sample character. The detailed operations preferably performed by the segmentation unit 22 during feature extraction are described in U.S. patent application Ser. No. 08/204,031, filed on Mar. 1, 1994 now U.S. Pat. No. 5507135. Those skilled in the art will recognize that in an alternate embodiment, additional or fewer features could be calculated.

Figure 4:
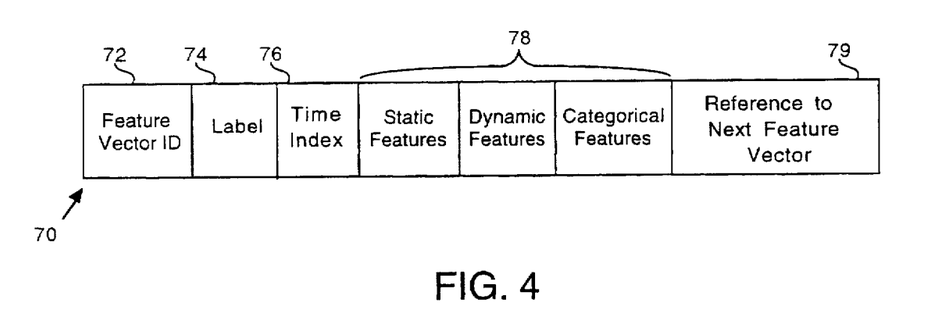
FIG. 4 is a block diagram of a preferred embodiment of a feature vector of the present invention.

The segmentation unit 22 stores each segment's set of extracted features as a feature list within a feature vector 70. Referring now to FIG. 4, a block diagram of a preferred embodiment of a feature vector 70 is shown. The feature vector 70 is a data structure comprising a first data field 72 for storing a unique feature vector identification (ID); a second data field 74 for storing a label; a third data field 76 for storing a time index; a fourth data field 78 for storing a feature list that includes the calculated static, dynamic, and categorical features; and a fifth data field 79 for storing a reference to a next feature vector 70. The feature vector ID is preferably a reference to the sample character with which the feature vector 70 is associated. The feature vector's label is used to categorize the feature vector, as will be described in detail below. The feature vector's time index preferably indicates the particular time interval to which the feature vector's associated segment pertains. In the preferred embodiment, the time index is a number. Thus, in the set of feature vectors 70 associated with a given sample character, a first feature vector 70 corresponds to a first portion of the sample character that was drawn during an initial or first time interval; a second feature vector 70 corresponds to a second portion of the sample character that was drawn during a second time interval; and so on.

The reference to a next feature vector 70 stored in the feature vector's fifth data field 79 is preferably a reference to a feature vector 70 that has a next-higher time index and that is associated with the same sample character. In the preferred embodiment, the feature vector 70 having the next-higher time index is the next feature vector created 70. Thus, during the creation of a next feature vector 70 following the creation of a previous feature vector 70, the segmentation unit 22 preferably stores a reference to the next feature vector 70 in the previous feature vector's fifth data field 79. Those skilled in the art will recognize that in an alternate embodiment, the feature vector 70 could include additional data fields for storing additional references to other feature vectors 70, thereby facilitating the implementation of multiple types of feature vector lists. For example, all feature vectors associated with the same reference character in the known character set could be linked together.

In the preferred embodiment, each feature vector 70 is stored in the feature vector memory 34. The specific operations preferably performed by the segmentation unit 22 during feature vector creation are described in detail in U.S. patent application Ser. No. 08/204,031, filed on Mar. 1, 1994 now U.S. Pat. No. 5577135. Those skilled in the art will recognize that in general, the present invention can function with any type of segmentation unit 22 that receives character data as input, partitions the character data into segments according to a segmentation technique, and creates a type of feature vector 70 numerically representing each segment. Once each feature vector 70 has been created, the segmentation unit 22 issues a completion signal to the subcharacter generation unit 24.

Figure 5:
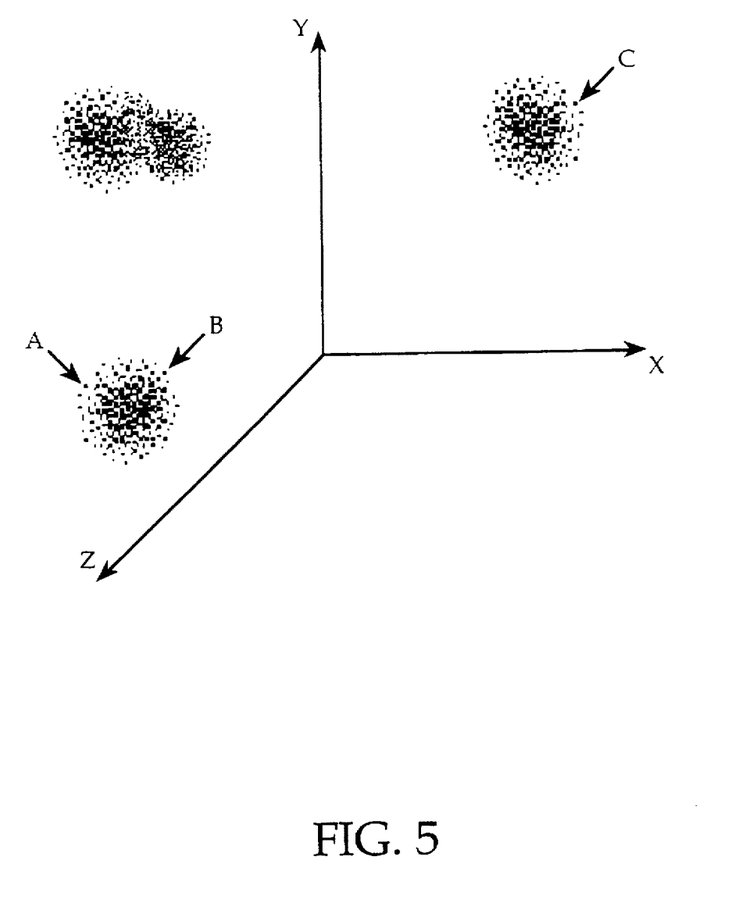
FIG. 5 is a diagram of a hypothetical distribution of three-element feature lists within an exemplary three-dimensional space.

Those skilled in the art will recognize that because each feature list has k entries, each feature list can be interpreted as a point in a k-dimensional space. Thus, within this k-dimensional space, any two feature lists are separated from each other by a "distance." The magnitude of this distance provides a measure of dissimilarity (or, equivalently, similarity) between the two feature lists according to the manner in which the distance is determined. Referring now to FIG. 5, a hypothetical distribution of three-element feature lists within an exemplary three-dimensional space is shown to aid understanding. The feature list identified by point "A" in FIG. 5 is more similar to the feature list identified by point "B" than to the feature list identified by point "C". As can be seen in FIG. 5, similar feature lists are grouped, or clustered, together in a region of the space.

In response to the completion signal issued by the segmentation unit 22, the subcharacter generation unit 24 organizes the feature vectors 70 generated by the segmentation unit 22 into a set of clusters, where each cluster represents a group of feature vectors 70 having feature lists that satisfy a predetermined dissimilarity condition, or equivalently, a distance metric, relative to each other. During the clustering, the subcharacter generation unit 24 creates a unique label for each cluster, and stores the label in the second data field 74 of each feature vector 70 associated with the cluster. Preferably, the label is a number. When the clustering is complete, the feature lists within any two identically-labeled feature vectors 70 satisfy the predetermined dissimilarity condition relative to each other. In an alternate embodiment, a list of labels could be stored in each feature vector 70, thereby associating each feature vector 70 with a first cluster of "most-similar" feature vectors 70, a second cluster of "next-most-similar" feature vectors 70, and so on. In the preferred embodiment, the subcharacter generation unit 24 performs the feature vector organization according to a conventional clustering method, such as the k-means method. Those skilled in the art will recognize that in general, the present invention can utilize any standard statistical clustering method.

Figure 6A:
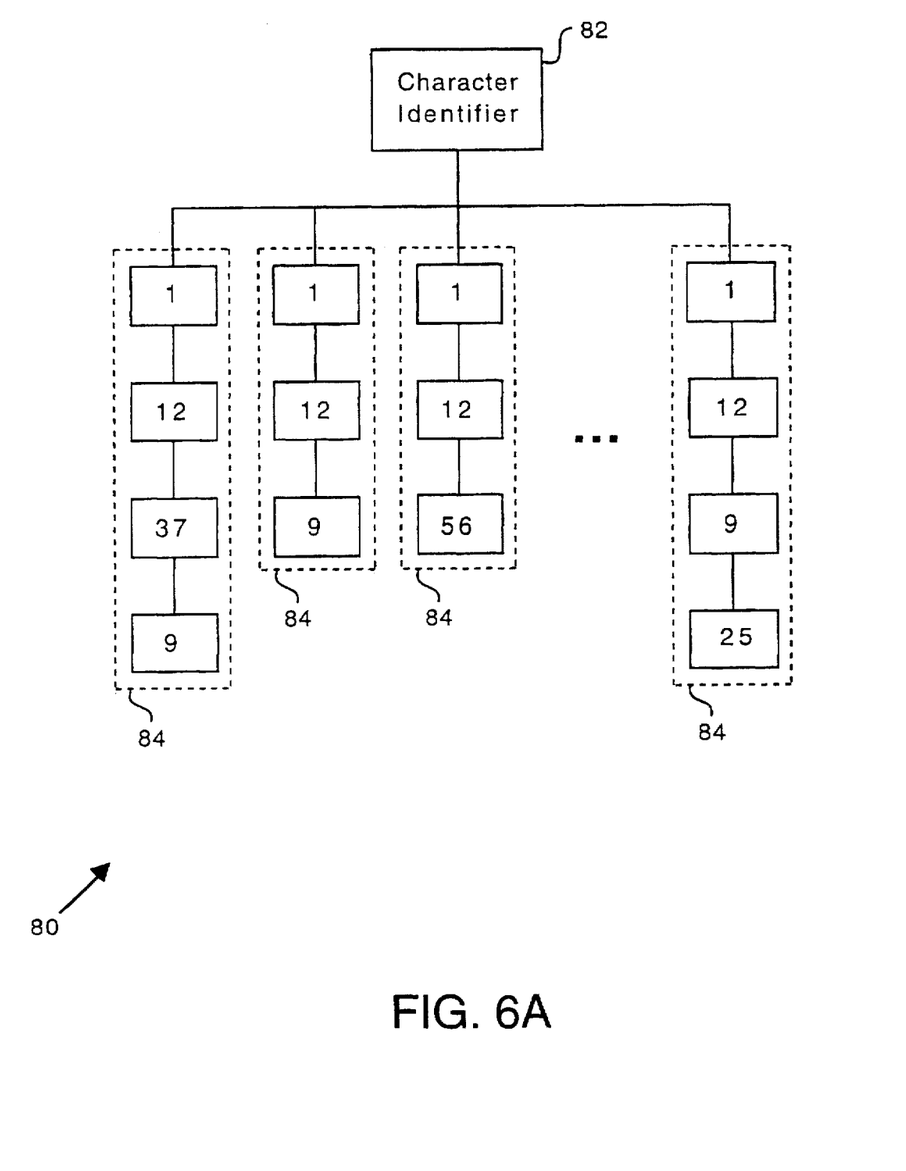
FIG. 6A is a block diagram of an exemplary detailed lexical graph produced by the system of the present invention.

Upon completion of the clustering, the subcharacter generation unit 24 issues a lexicon creation signal and a subsequent modeling signal to prompt the lexicon unit 26 and the modeling unit 28 in an iterative lexicon building and subcharacter unit determination process, respectively, as will now be described. In response to a lexicon creation signal issued by the subcharacter generation unit 24, the lexicon unit 26 first creates a detailed lexical graph 80 corresponding to a first reference character within the known character set for which at least one sample character has been entered. Preferably, the lexicon unit 80 searches sample character structures 50 stored in the character memory 30 to determine that a sample character corresponding to the selected reference character has been entered. Referring now to FIG. 6A, a block diagram of an exemplary detailed lexical graph 80 is shown. The detailed lexical graph 80 is a data structure having a head element 82 for storing the character identifier corresponding to the first reference character; and at least one label list 84, where each label list 84 is a list of feature vector labels associated with a particular sample character that corresponds to the first character. In other words, the detailed lexical graph 80 includes a label list 84 for each sample character that had been input as a representative version of the first reference character. In the preferred embodiment, the detailed lexical graph 80 is implemented as a linked list structure.

In the construction of a given label list 84, the lexicon unit 26 selects a feature vector 70 stored in the feature vector memory 34 and having a feature vector ID that specifies a first sample character corresponding to the first reference character, and a time index of "1". The time index of "1" indicates that the selected feature vector 70 corresponds to the first segment created from the first sample character. The lexicon unit 26 enters the selected feature vector's label in the first element of the label list 84. The lexicon unit 26 then identifies the next feature vector 70 referenced by the selected feature vector's fifth data field 79, and stores the next feature vector's label in the second element of the label list. Each remaining label is added to the label list 84 in an analogous manner, in order according to the next feature vector 70 referenced by a feature vector 70 currently under consideration. If a given feature vector's fifth data field 79 does not reference another feature vector 70, the lexicon unit 26 searches the feature vector memory 34 for a feature vector 70 having a feature vector ID that specifies a next sample character corresponding to the first reference character, and a time index of "1" If such a feature vector 70 is found, the lexicon unit 84 creates another label list 84 in the manner described above. The lexicon unit 26 repeats the above operations until each feature vector 70 having a feature vector ID that specifies a sample character corresponding to the first reference character has been considered.

Figure 6B:
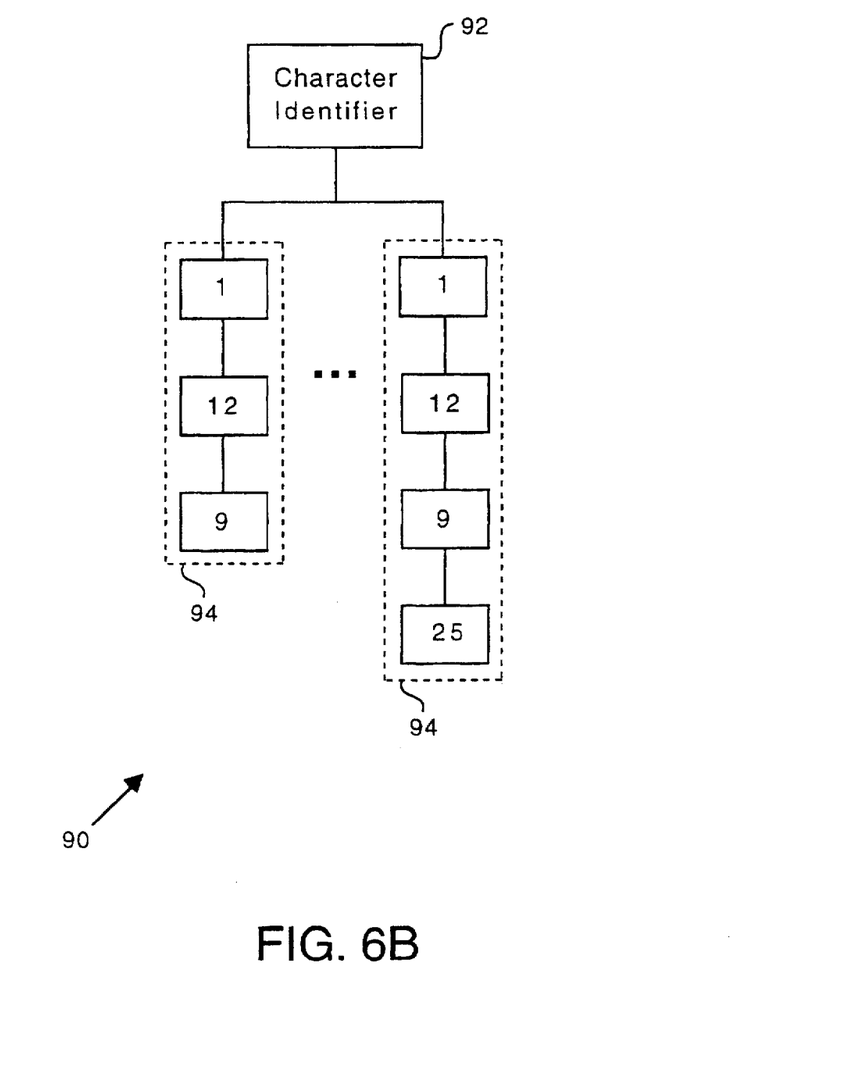
FIG. 6B is a block diagram of an exemplary simplified lexical graph produced by the system of the present invention and corresponding to the detailed lexical graph of FIG. 6A.

After creating the detailed lexical graph 80 for the first reference character, the lexicon unit 26 performs simplification operations to produce a simplified lexical graph 90. Referring now to FIG. 6B, a block diagram of an exemplary simplified lexical graph 90 corresponding to the detailed lexical graph 80 of FIG. 6A is shown. The simplification operations serve to simplify label sequences in each label list 84, and eliminate those label lists 84 that are redundant or very similar. In the preferred embodiment, the simplification operations are performed according to a dynamic programming method such as dynamic time warping, as described in detail in U.S. patent application Ser. No. 08/300,426, entitled "Automatic Method for Scoring and Clustering Prototypes of Handwritten Stroke-Based Data," filed on Sep. 2, 1994 now pending. In the simplification operations, the lexicon unit 26 preferably assigns a similarity score via dynamic time warping to each pair of feature vector sequences associated with a given detailed lexical graph 80; That is, for each label list pair in the detailed lexical graph 80, the lexicon unit 26 assigns a similarity score to the pair of feature vector sequences corresponding to the label list pair. The set of similarity scores for all feature vector sequence pairs associated with the detailed lexical graph 80 is preferably stored in the lexicon memory 36 as a distance matrix. The lexicon unit 26 next iteratively groups feature vector sequence pairs according to their similarity scores to form one or more simplification groups. For those feature vector sequence pairs that fall within the same simplification group, the lexicon unit 26 retains only that label list 84 corresponding to the feature vector sequence within the simplification group that is most-similar to each other feature vector sequence within the simplification group.

To serve as an example, it is assumed herein that the feature vector sequence pairs corresponding to those label lists 84 in FIG. 6A having label sequences (1-12-37-9), (1-12- 9), and (1-12-56) each fall within the same simplification group. It is further assumed that the feature vector sequence pairs associated with the label sequence pairs {(1-12-9), (1-12-37-9)} and {(1-12-9), (1-12-8)} are the most-similar feature vector sequence pairs within their simplification group. That is, the feature vector sequence corresponding to the label sequence (1-12-37-9) is more-similar to the feature vector sequence corresponding to the label sequence (1-12-9) than to the feature vector sequence corresponding to the label sequence (1-12-8). Therefore, the feature vector sequence corresponding to the label sequence (1- 12-9) is the best representative feature vector sequence of the three considered herein. Thus, in the simplification operations, the lexicon unit 26 will delete the label lists 84 having label sequences (1-12-37-9) and (1-12-56) in view of the label list having the label sequence (1- 12-9). The simplified lexical graph 90 shown in FIG. 6B therefore does not contain the aforementioned deleted label lists 84. Those skilled in the art will recognize that another means for simplifying the detailed lexical graphs 80 could be used in an alternate embodiment. In the preferred embodiment, each detailed lexical graph 80 is created and each simplified lexical graph 90 is stored in the lexicon memory 38.

After creating the simplified lexical graph 90 corresponding to the first reference character, the lexicon unit 26 creates a detailed lexical graph 80 and produces a corresponding simplified lexical graph 90 for each remaining reference character within the known character set for which at least one corresponding sample character has been entered. The set of all simplified lexical graphs 90 created is referred to herein as a lexicon. After all simplified lexical graphs 90 have been created, the lexicon unit 26 issues a completion signal. Those skilled in the art will recognize that in an alternate embodiment, the lexicon unit 26 could first create all required detailed lexical graphs 80, and then perform the simplification operations to produce the corresponding simplified lexical graphs 90.

In response to a modeling signal issued by the subcharacter generation unit 24, the modeling unit 28 determines for each set of feature vectors sharing an identical label a set of model parameters according to a pattern recognition model. In the preferred embodiment, the pattern recognition model is a Hidden Markov Model. Those skilled in the art will recognize that in an alternate embodiment, another pattern recognition model such as a neural network could be used.

A Hidden Markov Model describes a system as a set of N distinct states. Ideally, N is chosen according to a particular Hidden Markov Model topology, such that the set of N states is the smallest set of states that can successfully model the system's behavior. Associated with each state are M distinct observation symbols, where each observation symbol corresponds to a physically-observable signal. At any given time. the system is in a particular state. The probability that any given observation symbol will be actually be observed when the system is in a particular state is given by an observation symbol probability matrix. The probability that the system will transition to any other state is given by a state-transition probability matrix. The observation symbol probability matrix and the state-transition probability matrix are referred to herein as the Hidden Markov Model's model parameters.

In the development of a Hidden Markov Model. the model parameters are determined from a set of input signals according to a parameter estimation method. The determination of the model parameters is often referred to as a "learning" or "training" stage. After the model parameters have been determined. the application of any given input signal to the Hidden Markov Model results in the output of a likelihood value that indicates the probability that the applied input signal can be accurately described according the Hidden Markov Model's model parameters. In other words. the likelihood value provides a measure of similarity between the applied input signal and the set of input signals that were used to determine the model parameters.

In the present invention. the modeling unit 28 models each set of identically-labeled feature vectors 70 with a Hidden Markov Model. Thus. the number of Hidden Markov Models generated equals the number of clusters created during the feature vector clustering described above. Because each Hidden Markov Model corresponds to a set of identically-labeled feature vectors, each Hidden Markov Model corresponds to a label. In the preferred embodiment, each Hidden Markov Model contains four states, where each state can transition to itself or to another state. The number of observation symbols M is given by the number of feature vectors 70 within the set of identically-labeled feature vectors associated with the Hidden Markov Model. Thus. the observation symbols themselves are feature vectors 70.

In the preferred embodiment. the modeling unit 28 determines model parameters for each set of identically-labeled feature vectors 70 according to the conventional Baum-Welch parameter estimation method. Those skilled in the art will recognize that in an alternate embodiment. another parameter estimation method. such as a gradient method, could be used. The model parameters corresponding to a set of identically-labeled feature vectors 70 are the subcharacter unit for that set of feature vectors 70. In the preferred embodiment. the modeling unit 28 stores each subcharacter unit. that is. the model parameters for a given set of identically-labeled feature vectors 70, in the model memory 38. As will be described in detail below, the present invention iteratively refines the set of subcharacter units. After model parameters have been generated for each set of identically-labeled feature vectors 70. the modeling unit 28 issues a completion signal.

The subcharacter generation unit 24 performs relabeling operations in response to the completion signal issued by the modeling unit 28. In the relabeling operations. the subcharacter generation unit 24 applies each feature vector 70 to each Hidden Markov Model. and relabels the feature vector 70 with the label associated with the Hidden Markov Model that produces the highest likelihood value. That is. the subcharacter generation unit 24 stores in each feature vector's second data field 74 the label associated with the Hidden Markov Model that produces the highest likelihood value. Thus. in the relabeling operations. the subcharacter generation unit 24 selectively redefines each set of identically-labeled feature vectors 70 to maximize the probability that any individual feature vector can be successfully modeled by the subcharacter unit associated with that feature vector's label.

Upon completion of the relabeling operations. the subcharacter generation unit 24 determines whether a convergence criterion has been satisfied. Preferably. the convergence criterion indicates that the change in a Hidden Markov Model's overall likelihood value for the corresponding set of identically-labeled feature vectors 70 is less than a predetermined amount. or whether a maximum allowed number of iterations has been reached. The overall likelihood value is given by the product of the individual likelihood values for those feature vectors 70 associated with the Hidden Markov Model. Those skilled in the art will recognize that in an alternate embodiment. another convergence criterion. such as solely relying upon a fixed number of iterations. could be used.

If the convergence criterion is not satisfied. the subcharacter generation unit 24 directs the lexicon unit 26 in a recreation of the lexicon in the same manner as described above. The subcharacter generation unit 24 then directs the modeling unit 28 in a new model parameter determination for each set of identically-labeled feature vectors. after which the subcharacter unit 24 performs the relabeling operations and determines whether the convergence criterion has been satisfied. in accordance with the above descriptions. Once the convergence criterion has been satisfied, iterative refinement of the lexicon and iterative refinement of the set of subcharacter units is complete.

Those skilled in the art will recognize that once the set of subcharacter units and the lexicon have been generated. the present invention can be used to perform general-purpose handwriting recognition operations. For example. if a test character is drawn, the segmentation unit 22 can create a set of segments and a set of feature vectors 70 associated with the test character. Next. a recognition unit (not shown) could input each of the test character's associated feature vectors 70 into the set of Hidden Markov Models previously generated by the modeling unit 28. and store in each such feature vector 70 the label associated with the Hidden Markov Model that produced the highest likelihood value. The recognition unit could then construct a sequence of labels from the test character's associated feature vectors 70. and compare the test character's label sequence with label sequences in the lexicon to identify the test character as a particular character within the known character set.

In the present invention. the set of subcharacter units and the lexicon are automatically created using information inherent in the sample characters themselves. Preferably. multiple users input at least one sample character corresponding to each character within the known character set. Thus. the subcharacter units generated by the present invention automatically account for user-to-user variations in handwriting style. Systems and methods for handwriting recognition based upon the set of subcharacter units generated by the present invention therefore do not require well-formed or printed test characters for successful test character recognition. Additionally. because of the clustering and iterative refinement of the set of subcharacter units performed by the present invention. each character within the known character set can be represented by a unique combination of subcharacter units. unlike radical-based approaches in the prior art. The use of a set of subcharacter units and lexicon generated by the present invention in a handwriting recognition environment therefore maximizes the probability that a test character will be correctly identified.

Figure 7:
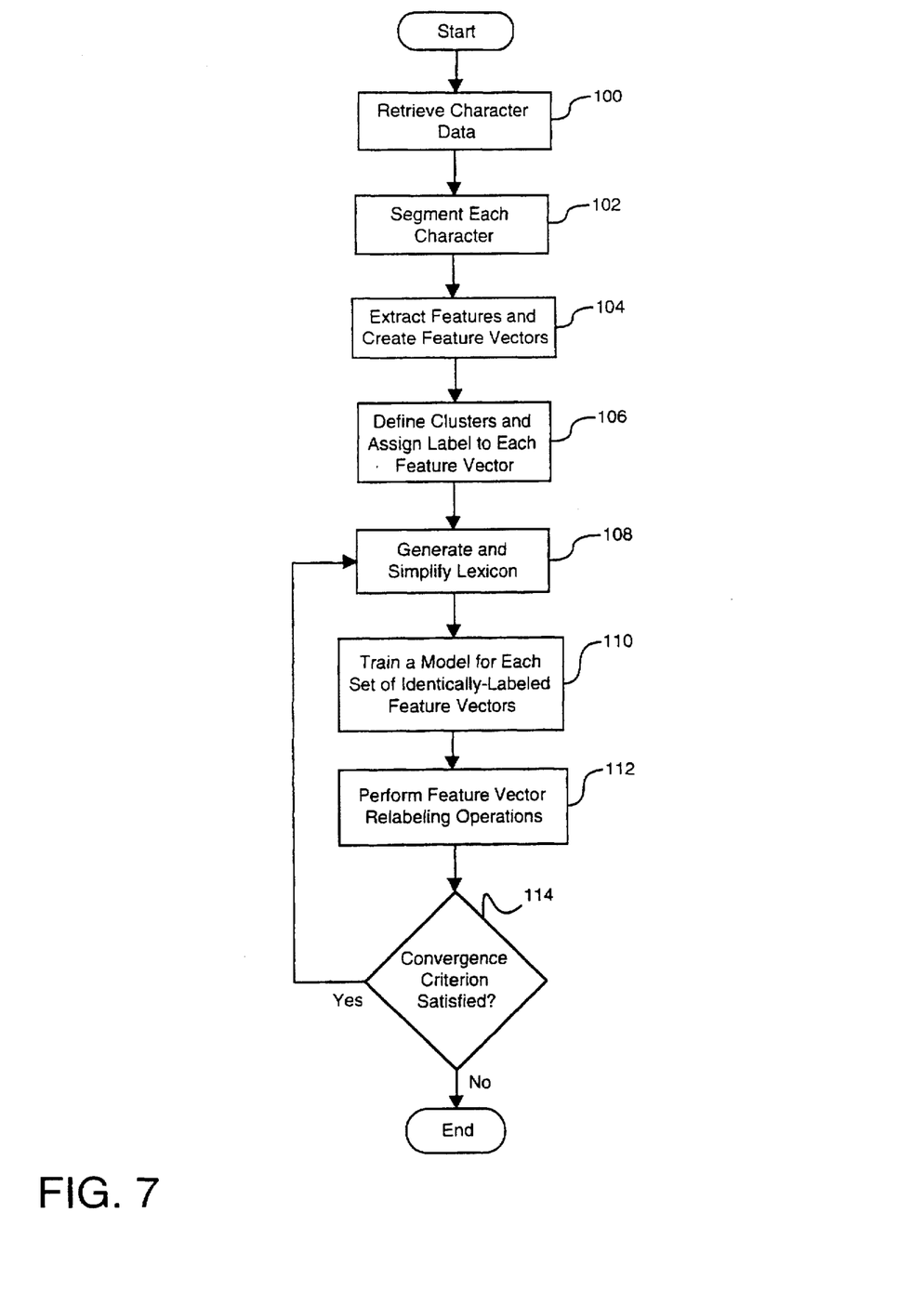
FIG. 7 is a flowchart of a preferred method for automatic subcharacter-unit and lexicon generation for handwriting recognition in accordance with the present invention.

Referring now to FIG. 7. a flowchart of a preferred method for automatic subcharacter-unit and lexicon generation in accordance with the present invention is shown. The preferred method begins in step 100 with the segmentation unit 22 retrieving sample character data from one or more users for each character within a known character set. Next, in step 102, the segmentation unit 22 segments each sample character, and stores each segment in a segment structure as described above. The segmentation unit 22 then performs feature extraction operations, and creates a set of feature vectors 70 in step 104.

Upon completion of step 104, the subcharacter generation unit 24 clusters the set of feature vectors 70 in step 106, and stores a label in each feature vector's second data field 74 in the manner described above. Next, in step 108, the lexicon unit 26 generates a detailed lexical graph 80, after which the lexicon unit 26 simplifies the detailed lexical graph 80 to arrive at the simplified lexical graph 90 for each character in the known character set, in the manner described above. Following step 108, the modeling unit 28 generates a Hidden Markov Model and determines model parameters for each set of identically-labeled feature vectors 70 in step 110. The subcharacter generation unit 24 subsequently performs feature vector relabeling operations in step 112, as described above and as described below with reference to FIG. 8. After step 112, the subcharacter generation unit 24 determines whether the convergence criterion has been satisfied in step 114. If not, the preferred method returns to step 108. Once the convergence criterion has been satisfied, iterative enhancement of the lexicon and the set of subcharacter units is complete and the preferred method ends.

Figure 8:
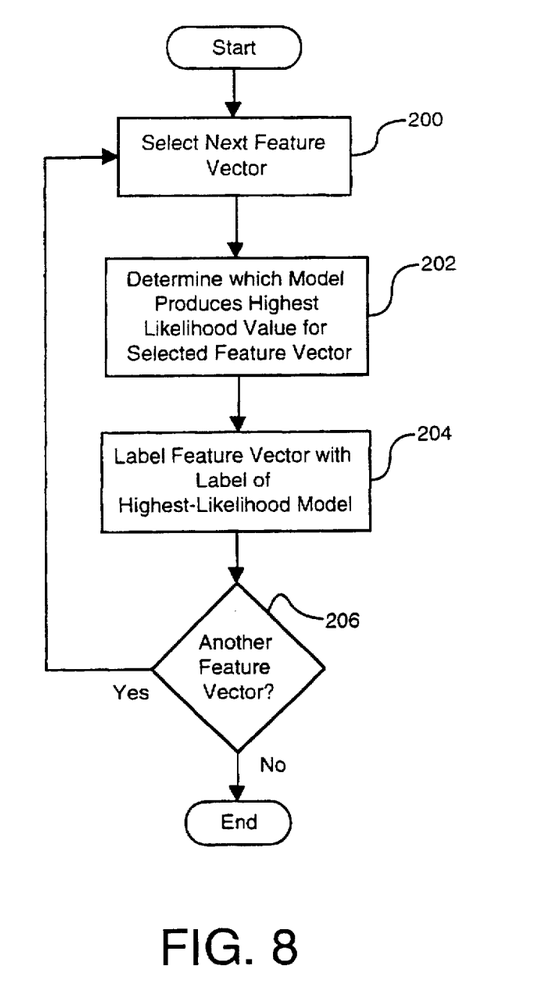
FIG. 8 is a flowchart of a preferred method for performing feature vector relabeling operations in the present invention.

Referring now to FIG. 8, a flowchart of a preferred method for performing relabeling operations (step 112 of FIG. 7) is shown. The preferred method begins in step 200 with the subcharacter generation unit 24 selecting a next feature vector 70. The subcharacter generation unit 24 then applies the selected feature vector 70 to each Hidden Markov Model generated by the modeling unit 26, and determines which Hidden Markov Model produces the highest likelihood value for the selected feature vector 70 in step 202. Next, in step 204, the subcharacter generation unit 24 stores the label associated with the Hidden Markov Model producing the highest likelihood value in the selected feature vector's second data field 74. Following step 204, the subcharacter generation unit 24 determines whether another feature vector 70 requires consideration in step 206. If so, the preferred method returns to step 200. Once each feature vector 70 has been considered, the preferred method ends.

While the present invention has been described with reference to certain preferred embodiments, those skilled in the art will recognize that various modifications may be provided. For example, the modeling unit 28 could generate a Continuous Hidden Markov Model for each set of identically-labeled feature vectors 70. As another example, the method described herein could be used to automatically and adaptively update the set of subcharacter units and the lexicon in response to a new user. These and other variations upon and modifications to the preferred embodiments are provided for by the present invention, which is limited only by the following claims.

What is claimed is:

1. In a handwriting recognition system having a processing unit, a handwriting input device, and a memory, a method for automatic subcharacter unit and lexicon generation comprising the steps of:

retrieving a plurality of sample characters, each sample character representing a reference character within a character set;

partitioning each sample character into a set of segments with associated time intervals;

creating a feature vector corresponding to each segment;

clustering the feature vectors according to a distance metric;

storing in each feature vector a label identifying a cluster with which the feature vector is associated;

creating a pattern recognition model for each set of identically-labeled feature vectors;

selecting a feature vector;

determining which pattern recognition model produces a highest likelihood value for the selected feature vector;

storing a label identifying the pattern recognition model producing the highest likelihood value in the selected feature vector;

determining whether a convergence criterion has been satisfied; and if said convergence criterion is satisfied, incorporating the segment corresponding to said labeled feature vector into a lexicon of subcharacters for said handwriting recognition system.

2. The method of claim 1, wherein the steps of selecting a feature vector, determining which pattern recognition model produces a highest likelihood value, and storing a label identifying the pattern recognition model are performed for each feature vector.

3. The method of claim 2, wherein the steps of creating a pattern recognition model, selecting a feature vector, determining which pattern recognition model produces a highest likelihood value, and storing a label identifying the pattern recognition model are repeated if it is determined that the convergence criterion is not satisfied.

4. The method of claim 1, wherein each feature vector includes a first data field for storing a reference to a corresponding sample character, a second data field for storing a time index, and a third data field for storing a feature list.

5. The method of claim 1, wherein the pattern recognition model is a Hidden Markov Model.

6. The method of claim 1, further comprising the steps of:

selecting a first reference character within the character set; and generating a detailed lexical graph corresponding to the selected reference character.

7. The method of claim 6, wherein the step of generating a detailed lexical graph comprises the steps of:

selecting a first feature vector generated from a first sample character associated with the selected reference character; and storing the label of the first feature vector in a label list that corresponds to the first sample character.

8. The method of claim 7, wherein the steps of selecting and storing are performed for each sample character associated with the selected reference character.

9. The method of claim 7, further comprising the steps of:

selecting a next feature vector generated from the first sample character; and storing the label of the next feature vector in the label list.

10. The method of claim 6, further comprising the step of simplifying the detailed lexical graph to produce a simplified lexical graph.

11. In a handwriting recognition system having a processing unit, a handwriting input device, and a memory, a method for automatic subcharacter unit and lexicon generation comprising the steps of:

retrieving a plurality of sample characters, each sample character representing a reference character within a character set;

partitioning each sample character into a set of segments, with associated time intervals;

creating a feature vector corresponding to each segment;

clustering the feature vectors created according to a distance metric;

storing in each feature vector a label identifying a cluster with which the feature vector is associated;

creating a pattern recognition model for each set of identically-labeled feature vectors;

selecting a feature vector;

determining which pattern recognition model produces a highest likelihood value for the selected feature vector;

storing a label identifying the pattern recognition model producing the highest likelihood value in the selected feature vector;

determining whether a convergence criterion has been satisfied;

selecting a first reference character within the character set;

generating a detailed lexical graph corresponding to the selected reference character; and simplifying the detailed lexical graph by using dynamic time warping to produce a simplified lexical graph.

12. In a handwriting recognition system having a processing unit, a handwriting input device, and a memory, a means for automatic subcharacter unit and lexicon generation comprising:

means for retrieving a plurality of sample characters;

means for creating a set of segments with associated time intervals associated with each sample character;

means for creating a feature vector corresponding to each segment;

means for clustering the feature vectors according to a distance metric;

means for storing in each feature vector a label identifying a cluster with which the feature vector is associated;

means for training a pattern recognition model for each set of identically-labeled feature vectors;

means for selecting a feature vector;

means for determining which pattern recognition model produces a highest likelihood value for the selected feature vector;

means for storing a label associated with the pattern recognition model producing the highest likelihood value in the selected feature vector;

means for determining whether a convergence criterion has been satisfied; and means for incorporating the segment corresponding to said labeled feature vector into a lexicon of subcharacters for said handwriting recognition system.

13. The means for automatic subcharacter unit and lexicon generation of claim 12, further comprising:

means for selecting a first reference character within the character set; and means for generating a detailed lexical graph corresponding to the selected reference character.

14. The means for automatic subcharacter unit and lexicon generation of claim 13, wherein the means for generating a detailed lexical graph corresponding to the selected reference character comprises:

means for selecting a first feature vector generated from a first sample character associated with the selected reference character; and means for storing the label of the first feature vector in a label list that corresponds to the first sample character.

15. The means for automatic subcharacter unit and lexicon generation of claim 13, further comprising means for simplifying the detailed lexical graph to produce a simplified lexical graph.

16. A system for automatic subcharacter unit and lexicon generation for handwriting recognition in a computer system having a processing unit and a handwriting input device, the system for automatic subcharacter unit and lexicon generation comprising:

a segmentation unit, for segmenting a sample character, with associated time intervals, and generating a set of feature vectors corresponding to the sample character, the segmentation unit coupled to receive a sample character from the handwriting input device;

a lexicon unit, for generating a detailed lexical graph, the lexicon unit coupled to receive a feature vector from the segmentation unit;

a modeling unit, for training a pattern recognition model corresponding to identically-labeled feature vectors, the modeling unit coupled to receive a feature vector from the segmentation unit; and a subcharacter generation unit, for clustering feature vectors, labeling feature vectors, and initiating the operation of the modeling unit, the subcharacter generation unit coupled to receive a feature vector from the segmentation unit and coupled to initiate the operation of the lexicon unit and the modeling unit to incorporate the segment corresponding to said labeled feature vector into a lexicon of subcharacters for said handwriting recognition system.

17. The system of claim 16, wherein the lexicon unit performs simplification operations upon the detailed lexical graph to produce a simplified lexical graph.

* * * * *